Oct. 16, 1956 A. J. TALAMINI, JR 2,767,255
AMPLIFIER CIRCUIT
Filed Nov. 27, 1951
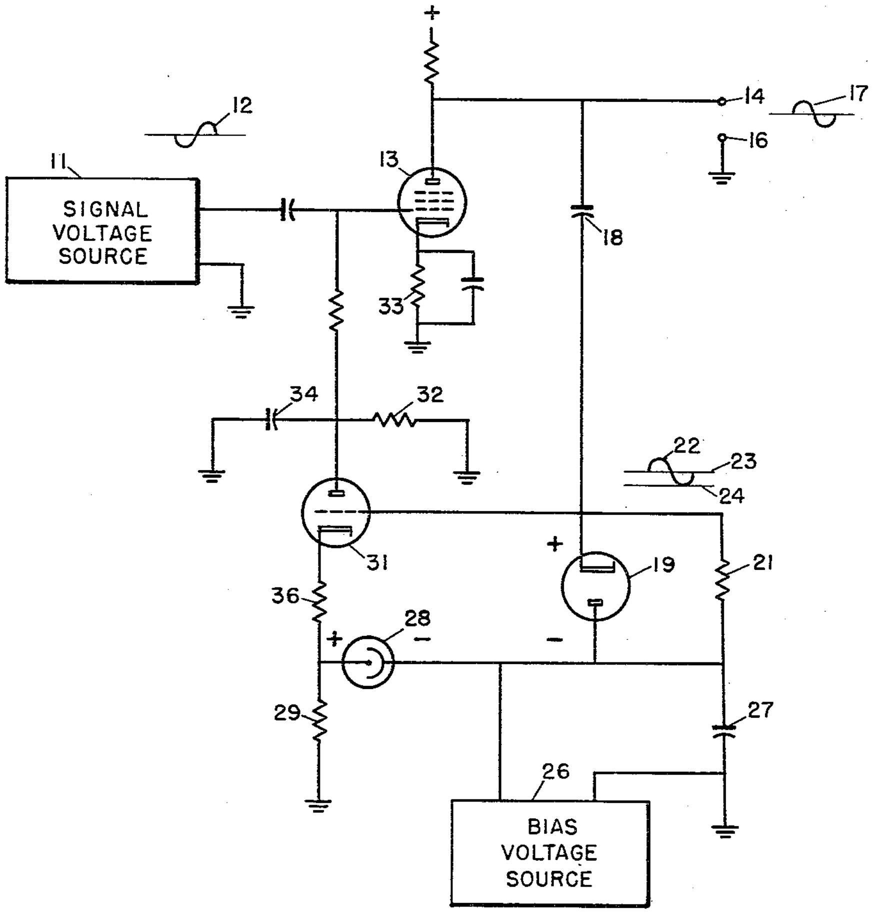
INVENTOR.
ARTHUR J. TALAMINI JR.
BY Darby & Darby
ATTORNEYS United States Patent Office 2,767,255

Patented Oct. 16, 1956

2,767,255

AMPLIFIER CIRCUIT

Arthur J. Talamini, Jr., Caldwell Township, Essex County, N. J., assignor to Allen B. Du Mont Laboratories, Inc., Clifton, N. J., a corporation of Delaware Application November 27, 1951, Serial No. 258,317

2 Claims. (Cl. 179—171)

This invention relates to electrical amplifier circuits and particularly to amplifier circuits for providing constant amplitude output signal voltages in response to variable amplitude input signal voltages.

It is well-known in automatic volume control circuits and the like, to rectify the signal voltage and use the rectified voltage as a volume-controlling voltage. Due to the usual difference in D. C. voltage level between input and output circuits of amplifier stage and the necessity for introducing the rectified signal into the input circuit at the proper D. C. level, some means must be provided to step down D. C. level. One step-down means commonly provided heretofore has been a potentiometer. However, reduction of the D. C. level by means of a potentiometer carries with it the attendant reduction of the rectified signal and consequently a reduction in the sensitivity of control.

It is one object of this invention to provide an improved amplifier circuit.

Other objects are: to provide an improved automatic volume control circuit, to provide a more sensitive automatic volume control, and to provide an improved feedback loop in an automatic volume control amplifier to transmit a large percentage of the controlling signal from the output circuit to the input circuit.

Other objects will be apparent after studying the following specification together with the drawing in which the only figure is a schematic representation of the circuit embodying the invention.

In the drawing, a source 11 of quasi-repetitive signals 12 is conventionally connected to the variable-mu amplifier tube 13. The term "quasi-" signifies signals which vary little in amplitude from cycle to cycle but may vary considerably over a period of a large number of cycles. The signal voltage 12 is amplified and inverted in polarity by the tube 13 and appears across the output terminals 14 and 16 as a signal 17.

The feedback loop comprises a rectifier circuit shown here as a peak rectifying circuit of the D. C. reinsertion type consisting of a coupling condenser 18 connected to the output circuit of tube 13 to transmit the signal 17 to the diode 19 and to store a charge in the well-known way. The diode 19 has a load resistor 21 in shunt therewith, to provide a leakage path for electrical charge on the condenser 18. It is well-known that the operation of this type of rectifier circuit is to elevate the average voltage across the diode 19 by an amount above a reference level substantially equal to the negative peak voltage of the signal 17 so that the resultant voltage across the diode 19 is represented by the wave form 22 in which the level 23 is the average or D. C. level and the level 24 is the reference level.

This reference level 24 is set by a bias voltage source 26, the negative terminal of which is connected to the plate of the diode 19 and the positive terminal of which is connected to ground. A condenser 27 is connected across the output terminals of the source 26 to assure a low impedance path to ground for the signal-frequency voltages appearing at the plate of the diode 19.

The cathode of the voltage regulator tube 28 is connected to the common junction of the bias source 26 and the plate of the diode 19, and a grounded resistor 29 completes the current path for the regulator tube 28.

It will be noted that polarity symbols are assigned to the tubes 19 and 28 and these symbols represent the polarity of the D. C. voltages appearing across the respective tubes. The control grid of a tube 31 is connected to the cathode of the tube 19 and the cathode of tube 31 is connected to the plate of tube 28 so that the algebraic sum of the voltages appearing across tubes 19 and 28 is the input signal voltage for tube 31. The plate resistor 32 for tube 31 is connected in series between the cathode and control grid of tube 13 so that the output voltage of tube 31 forms part of the grid bias voltage for tube 13. The remainder of the bias voltage of tube 13 is conventionally supplied by the voltage drop across the cathode resistor 33. A condenser 34 smooths out variations from the voltage across the load resistor 32 due to the signal frequency components of signal 22.

So long as the amplitude of the signal voltage 17 remains constant, a stable condition obtains according to the design of the circuit. However, if the amplitude of signal 17 increases for any reason, such as changes in the operating characteristics of the tube 13 or changes in the plate voltage supplied thereto, or for the more usual reason that the amplitude of the signal voltage 12 has changed, the feed-back loop operates to maintain the voltage 17 constant. An increase in the amplitude of voltage 17 causes an increase in the voltage difference between levels 23 and 24 in signal 22, causing the cathode of diode 19 to become more positive with respect to the plate.

The design conditions of the circuit are such that the algebraic sum of the voltages across tubes 19 and 28, for proper amplitude of signal 17, provides a prescribed bias voltage for tube 31. If desired, a part or all of this residual bias voltage may be generated as a voltage drop across a resistor 36 in the cathode circuit of tube 31 in which case the voltage across tube 28 would be equal to the D. C. component of the voltage across tube 19.

An increase of the positive voltage across tube 19 due to the aforementioned increase in the amplitude of the signal voltage 17 would therefore, upset the balance with respect to the tube 28 and result in an increase in plate current through tube 31 and through the load resistor 32. Since tube 31 is operated between ground voltage and the negative voltage at the plate of tube 28, an increase of current through the load resistor 32 would increase the voltage drop thereacross and increase that portion of the bias voltage on tube 13. As is well known, a more negative voltage on the grid of a variable mu tube, such as tube 13, decreases the gain of that tube, resulting in a decrease of the amplitude of signal voltage 17 to the predetermined level. Correspondingly, a reduction of the amplitude of signal 17 below the predetermined level results in an increase of the gain of the tube 13 to bring the amplitude up again.

Although an embodiment of this invention has been described, those skilled in the art may perceive modifications within the scope of the invention as determined by the following claims.

What I claim is:

1. An amplifier comprising a variable mu tube and a volume control circuit, said volume control circuit comprising a detector connected to the output circuit of said amplifier to receive the output signal voltage therefrom and to provide a detected signal voltage having a D. C. component of a given polarity, a source of voltage having a polarity opposite to the polarity of the detected signal voltage, a connection between said detector and said source to add the voltages therefrom in opposite polarity, a second amplifier having an input circuit connected to said detector and to said source of voltage to amplify the added voltages therefrom, and a load impedance common to the output circuit of said second amplifier and the input circuit of the first named amplifier, said load impedance being connected in series with the input circuit of said variable mu tube to control the gain thereof by means of the voltage from said second amplifier.

2. An amplifier circuit comprising a variable mu amplifier tube and a volume control circuit, said volume control circuit comprising a peak detector connected to the output circuit of said tube to receive the output signal voltage therefrom and to rectify said voltage, a source of reference voltage connected to said detector, the polarity of said reference voltage being opposite to the polarity of the rectified voltage, a second amplifier tube having an input circuit comprising a control grid and a cathode, said control grid being connected to the positive output terminal of said detector and said cathode being connected to the positive terminal of said source of voltage to amplify the algebraic sum of the voltages therefrom, a load impedance connected to the output circuit of said second amplifier tube, said load impedance being in series with the input circuit of said variable mu tube to control the gain thereof by means of the voltage from said second amplifier, and a filter between said detector and said input circuit of said variable mu tube to filter out the signal frequency components of the output voltage of said second amplifier.

References Cited in the file of this patent

UNITED STATES PATENTS

| | | |
|---|---|---|
| 2,559,245 | Fay | July 3, 1951 |
| 2,570,715 | Robinson | Oct. 9, 1951 |

OTHER REFERENCES

"Radio Engineering," text by Terman, 3d ed., pp. 326–327, 752–755, published 1947 by McGraw-Hill Book Co., N. Y.